US007706902B2

(12) United States Patent
Heubi et al.

(10) Patent No.: US 7,706,902 B2
(45) Date of Patent: Apr. 27, 2010

(54) METHOD AND SYSTEM FOR DATA LOGGING IN A LISTENING DEVICE

(75) Inventors: Alexandre Heubi, La Chaux-de Fonds (CH); Olivier Hautier, Savangnier (CH); Dustin Griesdorf, Waterloo (CA); Jakob Nielsen, Waterloo (CA); Todd Schneider, Waterloo (CA)

(73) Assignee: AMI Semiconductor, Inc., Pocatello, ID (US)

( * ) Notice: Subject to any disclaimer, the term of this patent is extended or adjusted under 35 U.S.C. 154(b) by 491 days.

(21) Appl. No.: 11/091,747

(22) Filed: Mar. 28, 2005

(65) Prior Publication Data

US 2005/0234572 A1 Oct. 20, 2005

(30) Foreign Application Priority Data

Mar. 30, 2004 (CA) .................................... 2462497

(51) Int. Cl.
*G06F 17/00* (2006.01)
*H04R 25/00* (2006.01)

(52) U.S. Cl. ........................................ 700/94; 381/317

(58) Field of Classification Search ................... 700/94; 381/312, 317, 323
See application file for complete search history.

(56) References Cited

U.S. PATENT DOCUMENTS 4,972,487 A 11/1990 Mangold et al. .............. 381/68
5,197,332 A * 3/1993 Shennib ....................... 73/585
5,332,928 A * 7/1994 Johnson ...................... 327/538
5,410,632 A * 4/1995 Hong et al. ................. 704/233
5,742,781 A * 4/1998 Bajwa ........................ 712/208
5,896,044 A * 4/1999 Walden ....................... 326/80
6,150,837 A * 11/2000 Beal et al. ...................... 326/39
6,166,960 A * 12/2000 Marneweck et al. ... 365/185.28
6,259,631 B1 * 7/2001 Menichelli et al. ..... 365/185.23
6,741,715 B2 * 5/2004 Andersen .................... 381/323
6,792,582 B1 * 9/2004 Cohn et al. .................... 716/7
6,820,240 B2 * 11/2004 Bednar et al. .................. 716/1
6,904,156 B1 * 6/2005 LeReverend ................ 381/312
7,242,777 B2 * 7/2007 Leenen et al. ................. 381/60
2004/0022393 A1 2/2004 Jones .......................... 381/56
2004/0066944 A1 4/2004 Leenen et al. ............... 381/314
2005/0110073 A1 * 5/2005 Spadea ....................... 257/315
2005/0141740 A1 * 6/2005 Preves et al. ................ 381/323

FOREIGN PATENT DOCUMENTS

EP 1367857 A1 12/2003
WO WO 01/54456 A1 7/2001

* cited by examiner

*Primary Examiner*—Xu Mei
*Assistant Examiner*—Daniel R Sellers
(74) *Attorney, Agent, or Firm*—Perman & Green LLP

(57) ABSTRACT

A method and system for data logging in a listening device is provided. The system includes a digital signal processing (DSP) entity, which performs normal hearing aid audio and system processing, a level translating module, and a non-volatile (NV) memory. The NV memory is used to store logged data. During the hearing aid audio processing, the DSP entity communicates with the NV memory via the level translating module. The level translating module performs voltage-translation during data logging to a communication signal between the DSP entity and the NV memory.

18 Claims, 4 Drawing Sheets

METHOD AND SYSTEM FOR DATA LOGGING IN A LISTENING DEVICE

CROSS-REFERENCE TO RELATED APPLICATIONS

This application claims priority from Canadian Patent Application No. 2,462,497, filed on Mar. 30, 2004.

FIELD OF INVENTION

This invention relates to signal processing technology, and more particularly, to a method and system for data logging in a listening device.

BACKGROUND OF THE INVENTION

Digital hearing aids have been developed in recent years. For example, in digital hearing aids for "In-The-Ear" (ITE) and "Behind-The-Ear" (BTE) applications, an audio signal is processed according to some processing scheme and subsequently transmitted to the user of the hearing aid through a hearing aid loud speaker (i.e. a hearing aid receiver).

For the signal processing, information such as parameters related to input and output signals or other signals may be stored in non-volatile memory during normal hearing aid operation. Such storing is known as data logging.

Because of current consumption limitations and audio artifacts that can be inadvertently caused, currently available hearing aids cannot perform data logging during the normal hearing aid operation (i.e., when the hearing aid is reproducing audio) without audible side-effects and excessive current drain.

Therefore, there is a need for providing a new method and system, which can execute data logging during normal hearing aid operation without audible side-effects and also provide reduced current drain.

SUMMARY OF THE INVENTION

It is an object of the invention to provide a novel method and system that obviates or mitigates at least one of the disadvantages of existing systems.

In accordance with an aspect of the present invention, there is provided a listening device which includes: a digital signal processing (DSP) entity for performing real time system processing including audio processing; a non-volatile (NV) memory for communicating with the DSP entity and storing logged data during an operation of the listening device; and a data logging manager for managing data logging, including: a level translating module for performing voltage level translation to a communication signal transferred between the DSP entity and NV memory.

In accordance with a further aspect of the present invention, there is provided a data logging manager for managing data logging in a listening device, the listening device including a digital signal processing (DSP) entity for performing real time system processing including audio processing, and a non-volatile (NV) memory for communicating with the DSP entity and storing logged data during an operation of the listening device. The data logging manager includes: a first port for communicating at a first voltage with the DSP entity, a second port for communicating at a second voltage with the NV memory, and a module being enabled during the operation of the listening device and for performing voltage level translation of a communication signal transferred from the DSP entity to the NV memory during the data logging.

In accordance with a further aspect of the present invention, there is provided a method of executing data logging during audio processing in a listening device. The listening device includes a digital signal processing (DSP) entity for system processing including audio processing and a non-volatile (NV) memory for storing logged data. The method includes the steps of: performing communication between the DSP and NV memory, including storing logged data at the NV memory during operation of the listening device, and managing data logging during the operation of the data logging, including translating voltage level of a communication signal transferred between the DSP entity and the NV memory.

Other aspects and features of the present invention will be readily apparent to those skilled in the art from a review of the following detailed description of preferred embodiments in conjunction with the accompanying drawings.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS OF THE INVENTION

The embodiment of the present invention is now described for a hearing aid. However, the present invention may be applied to different devices, such as, but not limited to, listening devices (e.g., headsets), or devices having a digital signal processor (DSP) entity and a non-volatile (NV) memory.

In the embodiment of the present invention, data logging is defined as the process of monitoring data (such as, but not limited to, parameters related to input and output signals or other signals like operating time) and storing data associated with the data into a NV memory.

Figure 1:
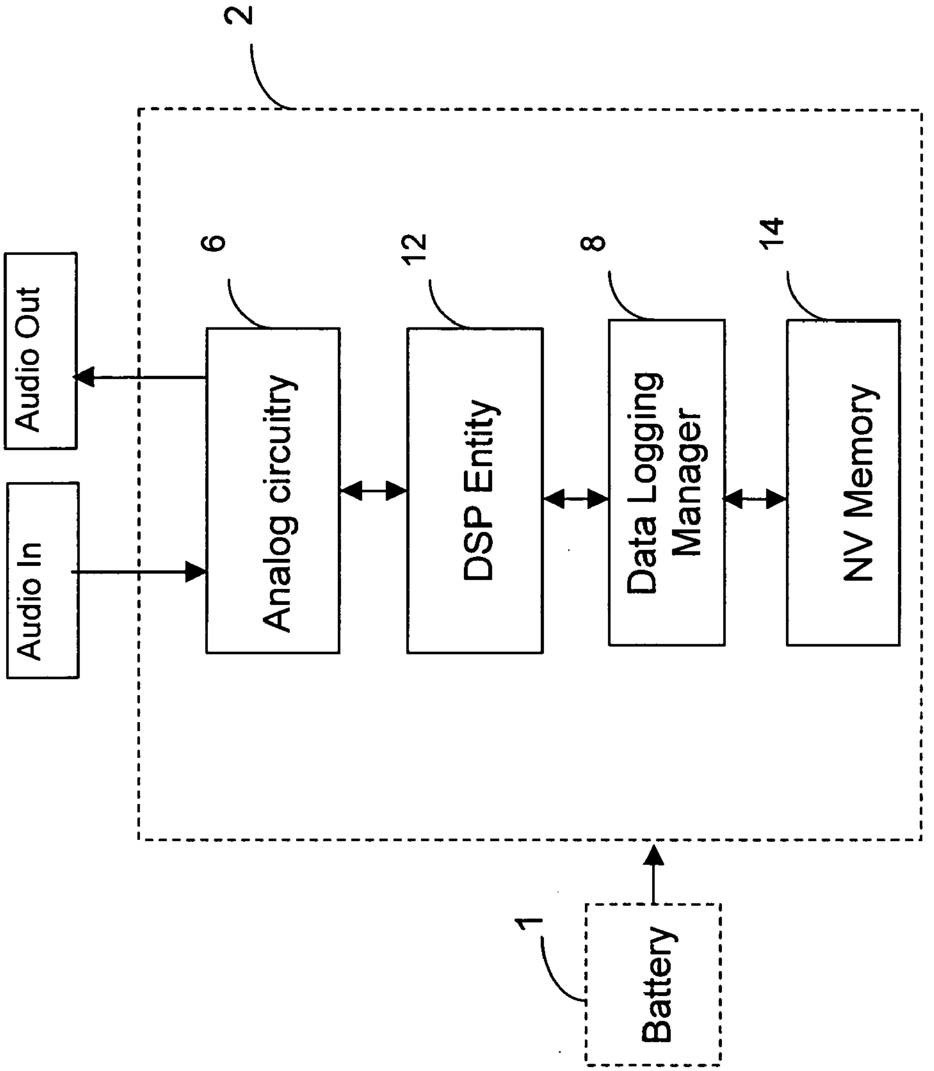
FIG. 1 is a block diagram showing one example of a hearing aid system to which a data logging manager in accordance with an embodiment of the present invention is suitably applied.

FIG. 1 shows one example of a hearing aid system 2 to which a data logging manager 8 in accordance with an embodiment of the present invention is suitably applied. The hearing aid system 2 includes one or more digital signal processors (DSPs) or other audio processing entities (e.g., DSP entities). In FIG. 1, one DSP entity 12 is shown. The hearing aid system 2 further includes analog circuitry 6 for analog signal processing, a data logging manager 8 and a NV memory 14.

The DSP entity 12 and NV memory 14 communicate with each other. The DSP entity 12 executes real time processing including audio processing. The NV memory 14 is used to store logged data as described below. The data logging manager 8 manages data logging process during a normal hearing aid operation. Data are transferred between the NV memory 14 and the DSP entity 12 through the data logging manager 8.

The data logging manager 8 may be automatically or manually enabled and disabled by the DSP entity 12.

The NV memory 14 may also be used for storage of application code and information relevant to a specific application, such as fitting information. The application code represents signal processing algorithms and other system processing, and is the code that the DSP entity 12 executes during operation. The fitting information is used to configure the algorithm in order to provide the signal enhancement for a specific hearing impaired user or range of users. In most cases, the fitting information is different for each user, and is stored on a per-user basis, but this is not a requirement. The information relevant to a specific application may include manufacturing information related to tracking the origin of a given hearing aid system in case of the return of a defect part.

The NV memory 14 may include an EEPROM, flash memory, other similar NV memory, such as storage elements/modules/memories for storing data in non-volatile manner, or combinations thereof.

In FIG. 1, the data logging manager 8 is provided separately from the DSP entity 12 and the NV memory 14. However, the data logging manager 8 may be incorporated into the DSP entity, the NV memory 14 or a combination thereof. The analog circuitry 6, the DSP entity 12 and the data logging manager 8 may be comprised of one or several interconnected integrated circuits that form a circuitry.

A battery 1 supplies power to the hearing aid system 2. In FIG. 1, the battery 1 is shown as separated from the hearing aid system 2. However, the battery 1 may be provided within the hearing aid system 2.

The data logging manager 8 may includes a level translating element or module (30) for level translation between the DSP entity 12 and the NV memory 14 as described below.

Figure 2:
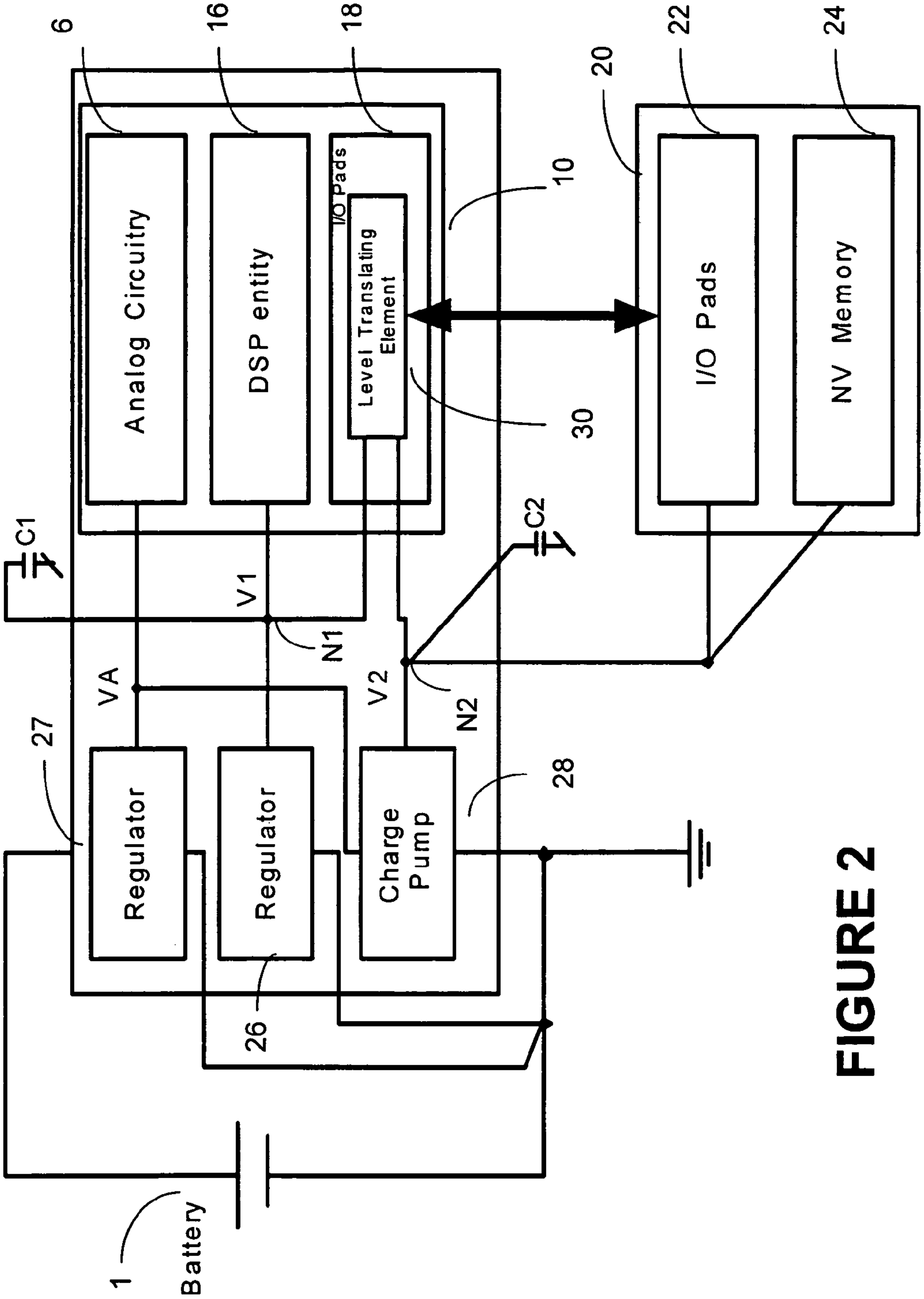
FIG. 2 is a schematic diagram showing a detailed example of the hearing aid system of FIG. 1.

FIG. 2 shows a detailed example of the hearing aid system 2 for data logging. The hearing aid system 2 of FIG. 2 includes a subsystem 10 and a NV storage module 20. In FIG. 2, "16" corresponds to the DSP entity 12 in FIG. 1, and "24" corresponds to the NV memory 14 in FIG. 1.

The subsystem 10 contains a DSP entity 16, in which the signal processing is performed, and one or more input/output (I/O) pads 18. The I/O pads 18 incorporate the level translating element 30. The subsystem 10 may be an integrated circuit or several interconnected integrated circuits forming a circuitry.

The NV storage module 20 includes a NV memory 24 and one or more I/O pads 22. The DSP entity 16 and the NV memory 24 communicate with each other through the I/O pads 18 and the I/O pads 22. In FIG. 2, the NV memory 24 is provided separately from the subsystem 10. However, the NV memory 24 may also be embedded in the subsystem 10.

The level translating element 30 performs level translation to communication signals transmitted between the DSP entity 16 and the NV memory 24. The level translating element 30 allows communication signals from the DSP entity 16 to be voltage-translated to the voltage at which the NV storage module 20 requires for communication. Similarly, the level translating element 30 allows signals from the NV storage module 20 to be voltage-translated to the same voltage at which the DSP entity 16 required for communication. The level translation may be automatically re-enabled under automatic or manual control of the DSP entity 16 whenever data logging is needed.

It is recognized that an equivalent arrangement where the level translating element 30 is contained within the NV storage module 20, such as I/O pads 22, is also possible and that this configuration is functionally equivalent to the configuration described above.

One example of the level translating element 30 is now described in detail. The level translating element 30 utilizes voltages generated by a set of voltage generators, such as charge pumps, regulators, or similar units for converting voltage from the battery 1 into a plurality of operating voltages.

In FIG. 2, voltage regulators 26 and 27, and a charge pump 28 are provided for converting voltage. The voltage regulators 26 and 27 are connected to the battery 1. The voltage regulator 26 provides , a regulated voltage V1 to the DSP entity 16 and to the level translating element 30. The voltage regulator 27 provides a regulated voltage VA to the analog circuitry 6. The charge pump 28 boosts the regulated voltage VA to a voltage V2, which is sufficiently high to operate the NV storage module 20, and provides the voltage V2 to the level translating element 30 and the NV storage module 20.

The regulated voltage V1 is filtered by a filtering capacitor C1. The filtering capacitor C1 is provided to the V1 to obtain a low-noise voltage at node N1, to which the DSP entity 16 and the level translating element 30 are connected. The voltage V2 is filtered by a filtering capacitor C2. The filtering capacitor C2 is provided to the V2 to obtain a low-noise voltage at node N2, to which the level translating element 30 and the NV storage module 20 are connected.

In the example, the level translating element 30 has two ports; a first port and a second port. The first port communicates with the DSP entity 16 via bidirectional communication signals that are level translated as described above. The second port communicates with the I/O pad 22 via bidirectional communication signals that are level translated as described above. The V1 voltage at node N1 is supplied to the first port in the level translating element 30. The V2 voltage at node N2 is supplied to the second port in the level translating element 30. The level translating element 30 translates a signal (P1) with the voltage V1, which is provided on the first port, to the same signal (P1) with the voltage V2, which is provided on the second port. The signal (P1) with the voltage V2 is then provided to the I/O pads 22. The level translating element 30 translates a signal (P2) with the voltage V2, which is provided on the second port, to the same signal (P2) with the voltage V1, which is provided on the first port. The signal (P2) with the voltage V1 is then provided to the DSP entity 16. The level translating element 30 may have a circuitry or a number of interconnected circuitries.

Figure 3:
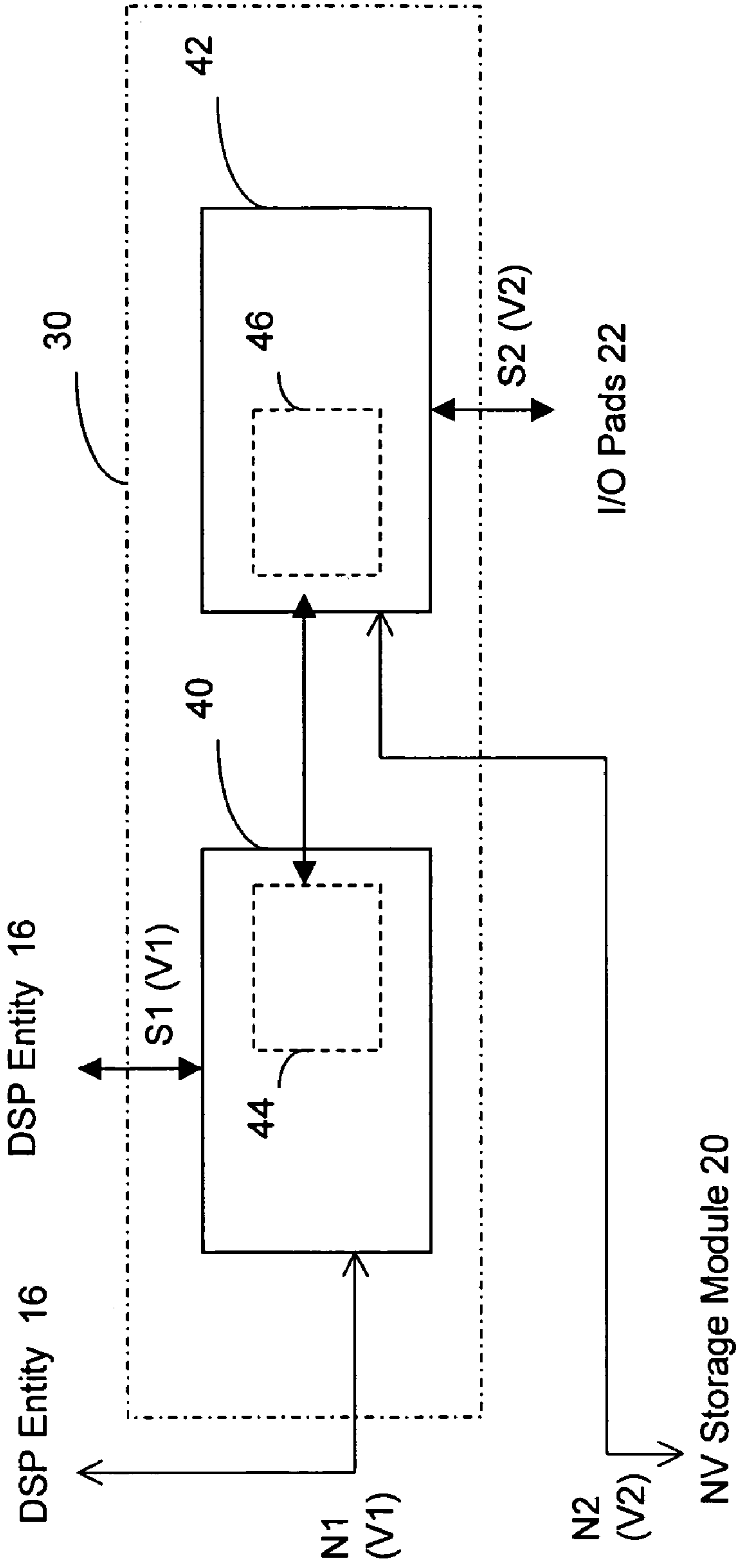
FIG. 3 is a schematic diagram showing an example of the level translating element of FIG. 2.

FIG. 3 shows one example of the level translating element 30 of FIG. 2. In FIG. 3, "40" represents the first port which communicates with the DSP entity 16, and "42" represents a second port which communicates with the I/O pad 22. As shown in FIG. 3, the level translating element 30 may include two circuitries 44 and 46. The circuitry 44 is embedded in the first port 40 that operates at the low voltage V1. The circuitry 46 is embedded in the second port 42 that operates at the higher voltage V2. The circuitries 44 and 46 are interconnected to each other. Each circuitry is enabled during data logging for voltage level translation. In this case, the interconnected circuitries 44 and 46 convert a signal S1 with an input voltage V1 to a signal S2 with an output voltage V2. The interconnected circuitries 44 and 46 convert a signal S2 with an input voltage V2 to a signal S1 with an output voltage V1. The methodology described above only performs voltage conversion of signals delivered to the I/O pads 18.

Different implementation schemes may exist. For example, the level translating element 30 may be implemented outside the actual I/O pad (leaving the pad to constitute a connection between the DSP entity 16 and the I/O pad 22 in the NV storage module 20 only).

An alternative way of logging data would be to perform switching of operating voltage whenever data logging is required. Upon the switching, the voltage of the node N1 is switched from the V1 voltage to the voltage V2. The voltage switching allows the DSP entity 16 and the NV storage module 20 to communicate with each other at the same voltage V2. However, this approach requires the whole subsystem (entity) 10 including I/O pads 18 to operate at the voltage V2. Operating the whole entity 10 on the voltage V2 causes undesirable audio artifacts. In the voltage switching moment, the filtering capacitor C1 would need additional charge to change the V1 voltage to the V2 voltage. This will cause the charge pump voltage to drop, and will cause audible side effects on the signal chain in the analog circuitry 6, since the charge pump voltage is generated from the VA. The VA is a voltage sensitive to variations since it supplies the noise-critical analog circuitry 6.

By contrast, in the embodiment of the present invention, only the level translating element 30 operates on the voltage V2. The subsystem 10 does not require any transfer of charge between the filtering capacitors C1 and C2 to access the NV storage module 20 since no switching of operating voltages are performed. Thus, no audible side effects are present during data logging when performing the voltage level translation.

More circuitry operates at a higher operating voltage when the voltage switching is employed for data logging, as compared to the level translation. Further, it is well known to a person skilled in the art that power consumed is proportional to the square of operating voltage. Thus, the voltage level translation also results in less power consumption than that of the switching.

Referring to FIGS. 1 and 2, examples 1)-2) of use for a data logging application are described below. It is noted that the use of a data logging application is not limited to any of these examples 1)-2).

1) In a data logging application, information related to an incoming signal or other part of the signal chain, or other statistics may be provided from the DSP entity (e.g., 12 of FIG. 1, 16 of FIG. 2) or other part of the signal chain, and is stored in the NV memory (e.g., 14 of FIG. 1, 24 of FIG. 2). Using the level translation, the DSP entity can perform signal processing including data logging without interrupting or corrupting the overall audio quality of the audio signal.

2) In a data logging application, parameters representing a surrounding sound environment may be extracted from an input signal as part of the signal processing in the DSP entity. These parameters are stored in the NV memory at discrete time intervals during normal hearing aid audio processing as shown in FIG. 4.

Figure 4:
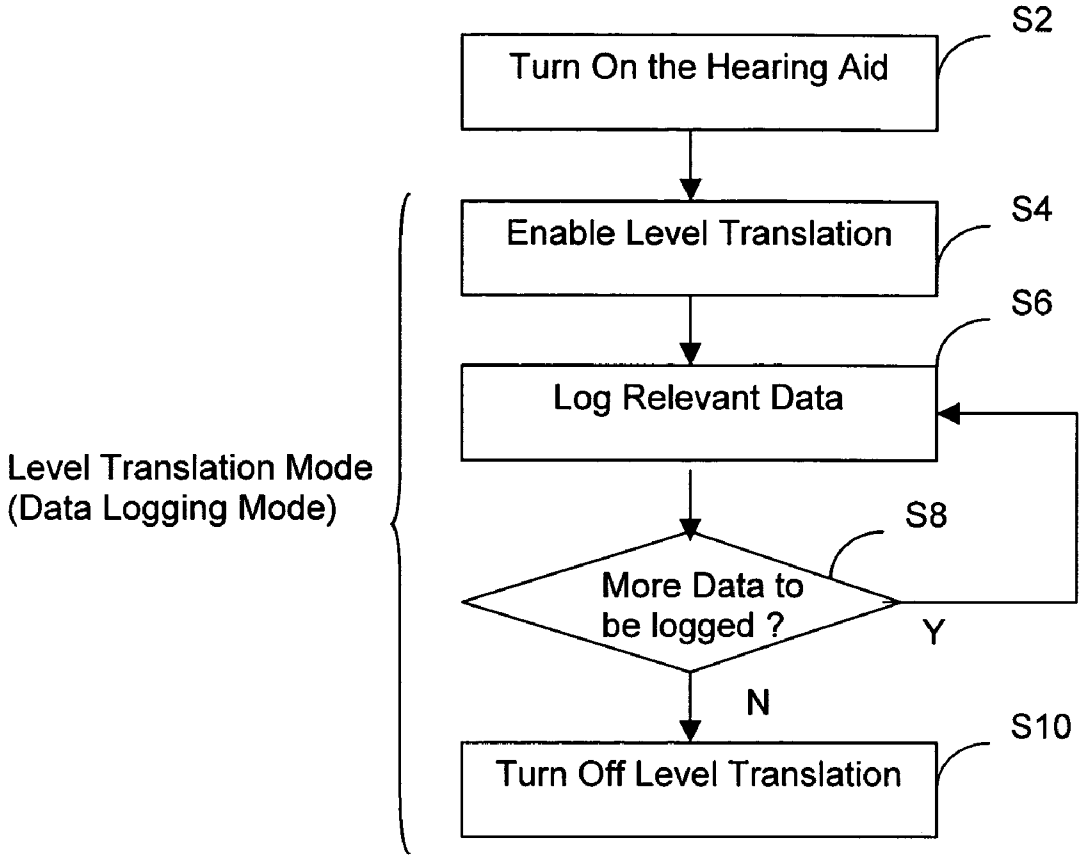
FIG. 4 is a flow chart showing one example of a system operation for the hearing aid system of FIG. 2.

FIG. 4 is a flow chart showing one example of a system operation for the hearing aid system 2 of FIG. 2.

Referring to FIGS. 2 and 4, when the hearing aid system 2 is turned on (step S2), the hearing aid system 2, under automatic or manual control of the DSP entity 16, enables the level translation mode (step S4). The level translating element 30 is turned on. Data logging is started (step S6). The DSP entity 16 stores data to be logged in the NV memory 24. After waiting a pre-determined or random time, it is determined whether there are any data to be logged (step S8). If the hearing aid system 2 does not need any more data to be logged, then the level translation mode is turned off (step S10). If yes, the system goes to step S6

According to the embodiment of the present invention, the level translation is performed to the communication signals, which are related to data-logging and are transferred between a DSP entity and a storage element or module. In the storage element or module, the logged data is stored in a non-volatile (NV) manner. This prevents audible side effects associated with data logging, i.e. read/write to and from the NV memory and the DSP entity, and also reduces the power consumed during data logging.

According to the embodiment of the present invention, logged data, such as information/parameters, are stored in the NV memory during a normal hearing aid operation. This prevents the logged parameters from being erased upon power down or reset of the hearing aid system.

The data logging manager of the present invention may be implemented by any hardware, software or a combination of hardware and software having the above described functions. The software code, either in its entirety or a part thereof, may be stored in a computer readable medium. Further, a computer data signal representing the software code which may be embedded in a carrier wave may be transmitted via a communication network. Such a computer readable medium and, a computer data signal and carrier wave are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A listening device comprising:

a digital signal processing (DSP) entity for performing real time system processing including audio processing, the DSP entity operating with a first voltage;

a non-volatile (NV) memory for communicating with the DSP entity and storing logged data during an operation of the listening device, the NV memory operating with a second voltage different than the first voltage; and a data logging manager for managing data logging to the NV memory during the production of audio to prevent at least one audible side effect associated with the data logging, the data logging manager including:

- a level translating module coupled with the first voltage and the second voltage for performing voltage level translation to communication signals including a first communication signal transferred from the DSP entity to the NV memory and a second communication signal transferred from the NV memory to the DSP entity;
- a first voltage regulator coupled to both the DSP and level translating module for providing the first voltage to the DSP and the level translating module; and
- a second voltage regulator coupled to a charge pump for providing the second voltage, the charge pump coupled to the level translating module for providing the second voltage to the level translating module.

2. A device as claimed in claim 1, wherein the level translating module includes:

a first port for communicating at the first voltage with the DSP entity, a second port for communicating at the second voltage with the NV memory, and a converting module for converting a voltage of a communication signal on each of the first port and the second port, wherein the first communication signal provided on the first port from the DSP entity, is converted to the first communication signal with the second voltage and is provided to the second port, and wherein the second communication signal provided on the second port from the NV memory, is converted to the second communication signal with the first voltage and is provided to the first port.

3. A device as claimed in claim 2, wherein the converting module includes a first circuitry embedded in the first port and for being enabled at the data logging and performing voltage level conversion, and a second circuitry embedded in the second port and for being enabled at the data logging and performing voltage level conversion, and wherein the first and second circuitries are interconnected to each other.

4. A device as claimed in claim 3, wherein the first and second circuitries are enabled by the DSP entity.

5. A device as claimed in claim 1, further comprising a subsystem which includes an audio circuitry for the audio signal processing, the DSP entity, the NV memory or combinations thereof.

6. A device as claimed in claim 1, wherein the level translating module is embedded in an input/output (I/O) pad provided to the DSP entity, an I/O pad provided to the NV memory or a combination thereof.

7. A device as claimed in claim 6, wherein the data logging manager is embedded in the DSP entity, the NV memory or a combination thereof.

8. A device as claimed in claim 1, wherein the level translating module is provided external to the DSP entity and the NV memory.

9. A device as claimed in claim 8, wherein the data logging manager is provided external to the DSP entity and the NV memory.

10. A device as claimed in claim 1, wherein the real time system operation includes an operation of a hearing aid.

11. A device as claimed in claim 1, further comprising an analog circuitry for performing analog signal processing, which is embedded into the same circuit as the DSP entity.

12. A device as claimed in claim 1, wherein the NV memory includes an EEPROM, flash memory, other similar NV memory, or combinations thereof.

13. A device as claimed in claim 1, wherein the NV memory is embedded into the same circuit as the DSP entity.

14. A method of executing data logging during production of audio in a listening device to prevent at least one audible side effect associated with the data logging, the listening device comprising:

a digital signal processing (DSP) entity for system processing including audio processing;

a non-volatile (NV) memory for storing logged data, the DSP entity operating with a first voltage, the NV memory operating with a second voltage the second voltage different than the first voltage;

a level translating module coupled with the first voltage and the second voltage for performing voltage level translation to communication signals;

a first voltage regulator coupled to both the DSP and level translating module for providing the first voltage to the DSP and the level translating module; and a second voltage regulator coupled to a charge pump for providing the second voltage, the charge pump coupled to the level translating module for providing the second voltage to the level translating module, the method comprising:

performing communication between the DSP and NV memory, including storing logged data at the NV memory during operation of the listening device, and managing data logging during the operation of the data logging, including translating a voltage level of a first communication signal transferred from the DSP entity to the NV memory from the first voltage level to the second voltage level, and translating voltage level of a second communication signal transferred from the NV memory to the DSP entity from the second voltage level to the first voltage level.

15. A method as claimed in claim 14, wherein the translating step includes at least one of the following steps:

performing voltage conversion of the first communication signal transferred from the DSP entity to the NV memory; and performing voltage conversion of the second communication signal transferred from the NV memory to the DSP entity.

16. A method as claimed in claim 14, wherein the translating step includes the steps of:

(a) performing a voltage level translation to the first communication signal with a first voltage from the DSP entity to provide the first communication signal with a second voltage, the first voltage being an operation voltage of the DSP entity, the second voltage being an operation voltage of the NV memory, and (b) performing a voltage level translation to the second communication signal with the second voltage from the NV memory to provide the second communication signal with the first voltage.

17. A method as claimed in claim 14, further comprising the step of:

enabling the voltage level translation by the DSP entity when turning on the listening device.

18. A device as claimed in claim 1, wherein the level translating module is switched on or off under the control of the DSP entity.

* * * * *